(12) United States Patent
Lenz

(10) Patent No.: US 6,401,298 B1
(45) Date of Patent: Jun. 11, 2002

(54) HINGE

(75) Inventor: Günter Lenz, Höchst (AT)

(73) Assignee: Julius Blum Gesellschaft m.b.H., Höchst (AT)

( * ) Notice: Subject to any disclaimer, the term of this patent is extended or adjusted under 35 U.S.C. 154(b) by 0 days.

(21) Appl. No.: 09/559,280

(22) Filed: Apr. 27, 2000

(30) Foreign Application Priority Data

Apr. 28, 1999 (AT) .................................................. 752/99

(51) Int. Cl.⁷ .............................................................. E05D 11/10
(52) U.S. Cl. ............................... 16/335; 16/336; 16/303
(58) Field of Search ............................ 16/335, 336, 864, 16/297, 303, 302

(56) References Cited

U.S. PATENT DOCUMENTS

| | | | | |
|---|---|---|---|---|
| 3,590,420 A | * | 7/1971 | Salice | 16/164 |
| 3,744,086 A | * | 7/1973 | Salice et al. | 16/164 |
| 4,543,686 A | * | 10/1985 | Rock et al. | 16/288 |
| 4,641,394 A | * | 2/1987 | Rock et al. | 16/302 |
| 4,654,930 A | * | 4/1987 | Lautenschlager, Jr. et al. | 16/288 |
| 5,617,612 A | * | 4/1997 | Ferrari et al. | 16/278 |

FOREIGN PATENT DOCUMENTS

| | | |
|---|---|---|
| DE | 24 08 057 | 8/1975 |
| DE | 3544488 A1 * | 6/1987 |
| DE | 36 16 028 | 11/1987 |
| DE | 297 05 943 U1 | 7/1997 |
| EP | 0 542 034 | 5/1993 |
| FR | 2 324 844 | 4/1977 |
| GB | 1185318 | 3/1970 |
| JP | 6-323055 * | 6/1994 |

* cited by examiner

Primary Examiner—Anthony Knight
Assistant Examiner—Mark Williams
(74) Attorney, Agent, or Firm—Wenderoth, Lind & Ponack, L.L.P.

(57) ABSTRACT

A furniture hinge comprises a hinge casing and a hinge arm, each adapted to be mounted on different furniture parts and connected by means of hinge links, and a pressure spring acting on one hinge link. The pressure spring is a leg spring which is mounted on a hinge axle connecting a hinge link to the hinge arm.

10 Claims, 3 Drawing Sheets

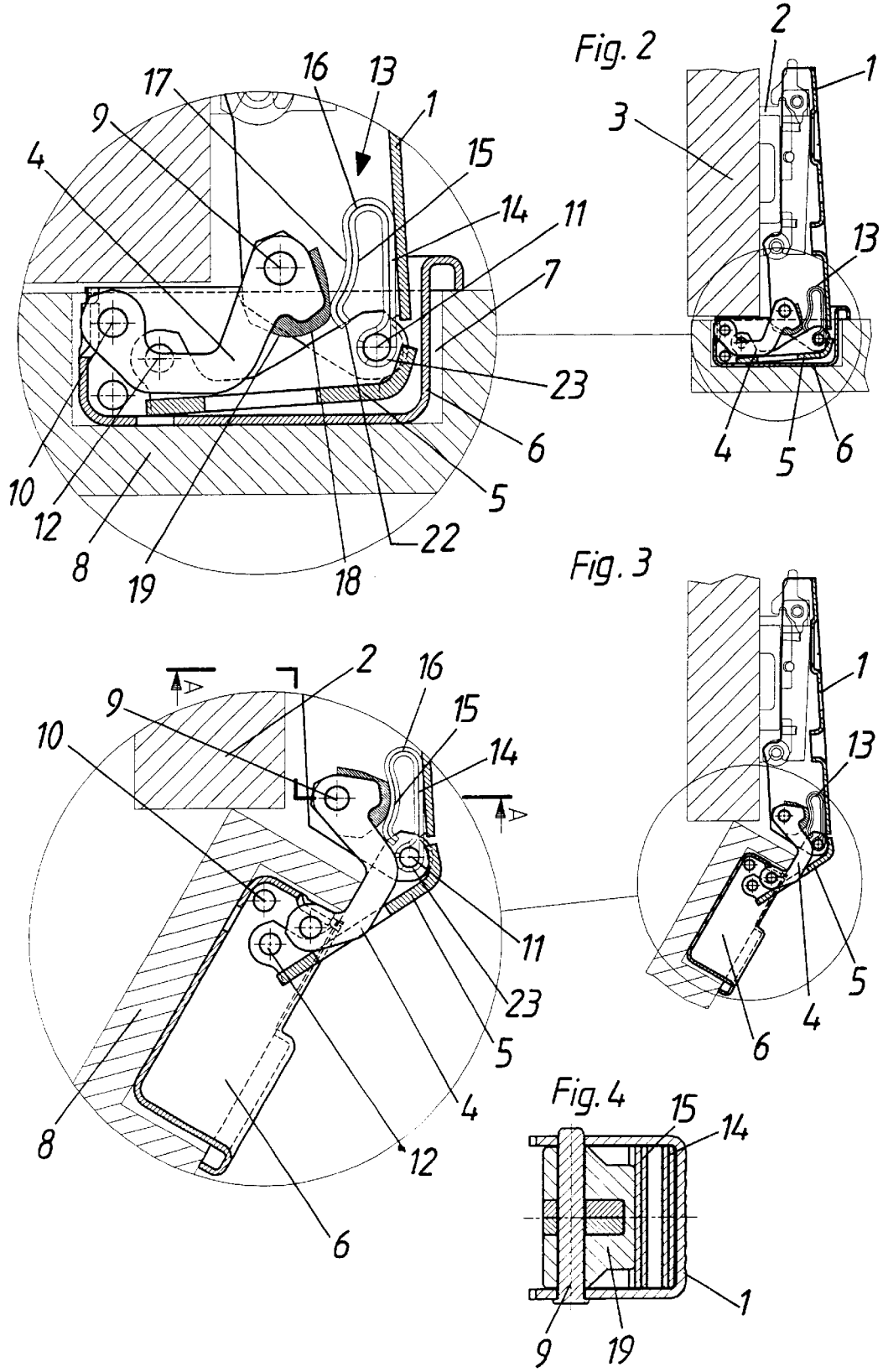

HINGE

BACKGROUND OF THE INVENTION

The invention relates to a hinge, particularly for use in hingedly connecting a furniture door to an article of furniture, said hinge comprising: a hinge arm adapted to be connected to an article of furniture; a casing adapted to be connected to a furniture door; a first, inner hinge link having first and second opposite ends, said first end of said inner link being pivotally connected to said hinge arm by a first axle, and said second end of said inner link being pivotally connected to said casing by a second axle; a second, outer hinge link having first and second opposite ends, said first end of said outer link being pivotally connected to said hinge arm by a third axle, and said second end of said outer link being pivotally connected to said casing by a fourth axle; said inner and outer links cooperating to form a quadrangular linkage connecting said casing to said hinge arm, such that said casing is movable about said quadrangular linkage between an open first position and a closed second position; a U-shaped leg spring being provided, one leg of said leg spring acting on said inner link and urging said inner link into the closed position when said casing is in or near the closed position.

Such a hinge is described in the German utility specification DE 29705943 U1.

SUMMARY OF THE INVENTION

It is the object of the present invention to produce a hinge of the above-mentioned kind whereby the spring force in increased.

According to the invention this object is achieved by the free end of the other leg of said leg spring being mounted on said third axle connecting said outer link to said hinge arm.

Mounting of the spring is improved by said leg spring consisting of a folded metal strip said strip at its folded end encircling said third axle.

To improve the working live of the spring and of the hinge the leg of spring which bears on the inner link is provided with a concave portion which bears on said guiding surface of said element.

To improve the hold of the spring in the closed position in an embodiment of the invention there is provided that the free end of that leg of said spring which bears on the inner link is turned towards the other leg of said spring.

BRIEF DESCRIPTION OF THE DRAWINGS

In the following two embodiments of the invention will be described in detail by means of the attached drawings.

FIG. 2 shows a section of a hinge according to the invention in the closed position, FIG. 3 shows a section of a hinge according to the invention in the opened position, FIG. 4 shows a section taken along Line A/A of FIG. 3.

DESCRIPTION OF THE PREFERRED EMBODIMENT

Figure 1:
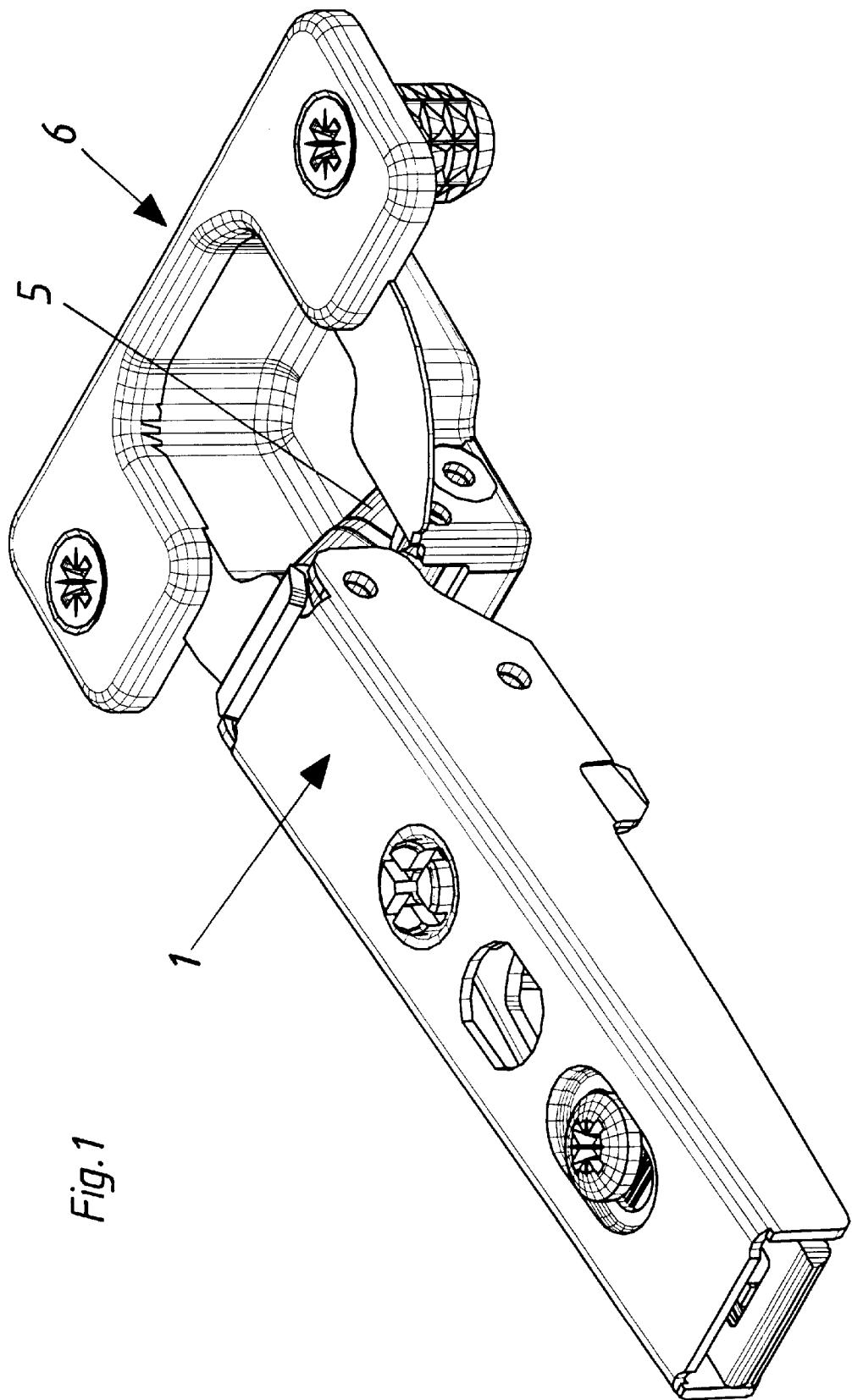
FIG. 1 shows a perspective view of a hinge according to the invention.

The hinge according to the invention is provided with a hinge arm 1 which is mounted on a furniture side wall 3 by means of a base plate 2.

The hinge arm 1 is connected to a hinge casing 6 by means of an inner hinge link 4 and an outer hinge link 5. The casing 6 is mounted within a bore 7 of a door 8.

The inner hinge link 4 is mounted on a hinge axle 9 mounted on the hinge arm 1 and a hinge axle 10 mounted in the casing 6. The outer hinge link 5 is mounted on an hinge axle 11 mounted on the hinge arm 1 and the hinge axle 12 mounted in the casing.

The leg spring 13 is also mounted on the hinge axle 11 connecting the outer hinge link 5 with the hinge arm 1.

The leg spring 13 is made from a metal strip which is wrapped around the hinge axle 11. The hinge axle 11 is positioned at the bend of the metal strip. The free ends of the legs of the leg spring 13 are directed towards the hinge casing 6 whereas the bend end 16 of the leg spring 13 is directed towards the rear end of the hinge arm 1.

The leg 15 of the leg spring 13 which bears on the inner hinge link 4 is provided with a concave portion corresponding to a guiding surface 18 of a guiding part of the inner hinge link 4.

In the embodiment according to FIGS. 2 to 4 the guiding part is a plug 19 made of plastic material which is mounted on the inner hinge link 4.

Figure 5:
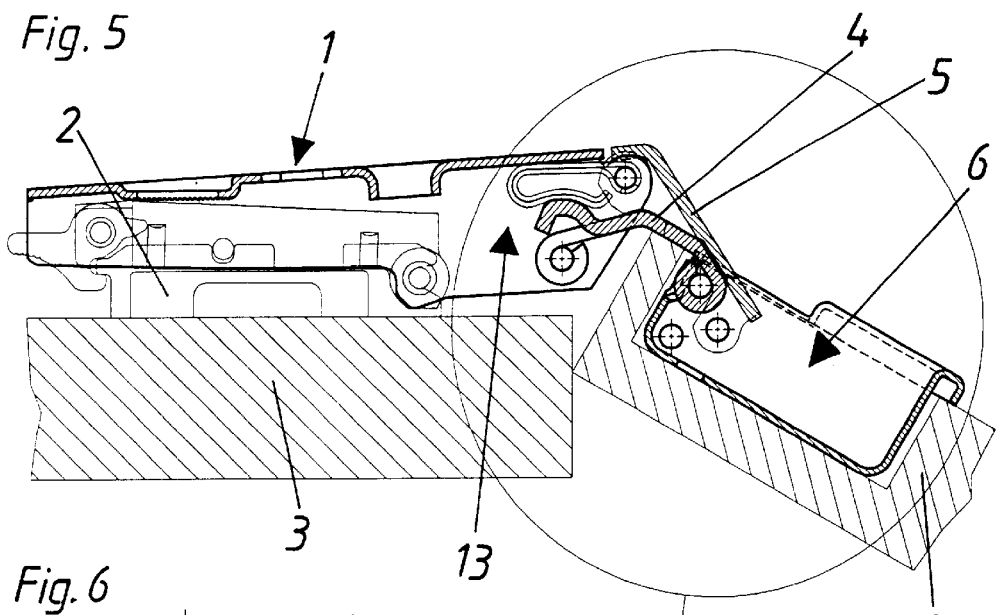
FIG. 5 shows a section of a further embodiment of the hinge according to the invention in the opened position and FIG. 6 shows a section taken along line A/A of FIG. 5.
Figure 6:
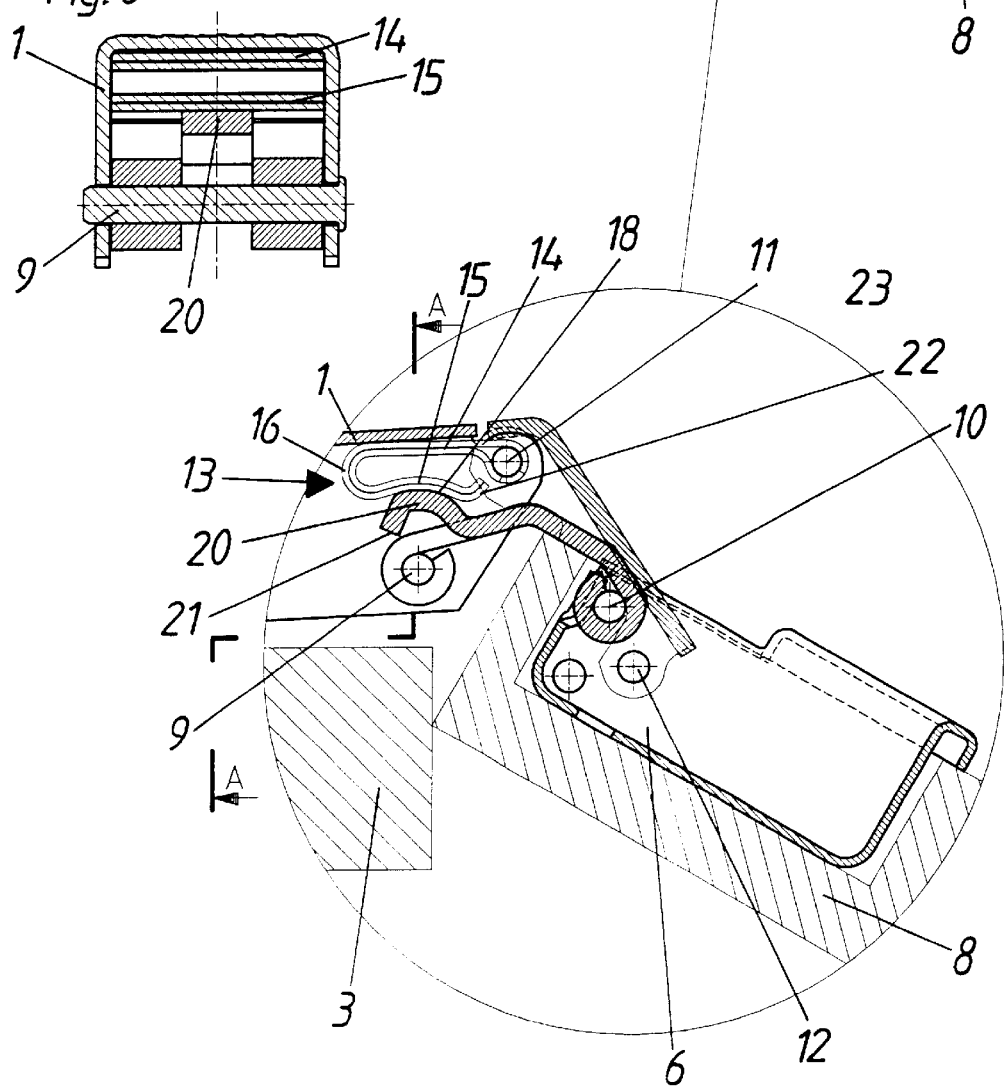

In the embodiment according to FIGS. 5 to 6 the guiding part is a flap 20 which is bent out of the inner hinge link 4. The flap 20 is again provided with a guiding surface 18 abutting the leg 15 of the leg spring 13.

The free end 21 of the flap 20 is directed towards the hinge axle 9.

The leg 15 of the leg spring 13 which bears on the inner hinge link 4 is provided with a free end 22 which is bend towards the other leg 14. In this way a good hold between the spring 13 and the guiding part 18, 20 is achieved in the closed position of the hinge.

What is claimed is:

1. A hinge for hingedly connecting a furniture door to an article of furniture, said hinge comprising:

a hinge arm adapted to be connected to an article of furniture;

a casing adapted to be connected to a furniture door;

an inner link having first and second opposite ends, said first end of said inner link being pivotally connected to said hinge arm by a first axle, and said second end of said inner link being pivotally connected to said casing by a second axle;

an outer hinge link having first and second opposite ends, said first end of said outer link being pivotally connected to said hinge arm by a third axle, and said second end of said outer link being pivotally connected to said casing by a fourth axle, said inner and outer links cooperating to form a quadrangular linkage connecting said casing to said hinge arm, such that said casing is movable about said quadrangular linkage between an open position and a closed position; and a U-shaped leg spring having a first leg acting on said inner link and urging said inner link into the closed position when said casing is in or near the closed position, and a second leg mounted on said third axle connecting said outer link to said hinge arm, wherein said leg spring comprises a folded metal strip having a folded end that encircles said third axle.

2. A hinge as claimed in claim 1, further comprising an element formed of plastic material, said element being fixedly positioned on said inner link at a position thereon adjacent the pivotal connection of said inner link to said hinge arm, said element having a curved guiding surface, wherein said leg spring bears on said guiding surface of said element.

3. A hinge as claimed in claim 1, wherein both ends of said first and second legs of said leg spring are directed towards said casing.

4. A hinge as claimed in claim 2, wherein said first leg of said leg spring is provided with a concave portion that bears on said guiding surface of said element.

5. A hinge as claimed in claim 1, wherein said first leg of said leg spring is turned towards said second leg of said leg spring.

6. A hinge for hingedly connecting a furniture door to an article of furniture, said hinge comprising:

a hinge arm adapted to be connected to an article of furniture;

a casing adapted to be connected to a furniture door;

an inner link having first and second opposite ends, said first end of said inner link being pivotally connected to said hinge arm by a first axle, and said second end of said inner link being pivotally connected to said casing by a second axle;

an outer link having first and second opposite ends, said first end of said outer link being pivotally connected to said hinge arm by a third axle, and said second end of said outer link being pivotally connected to said casing by a fourth axle, said inner and outer links cooperating to form a quadrangular linkage connecting said casing to said hinge arm, such that said casing is movable about said quadrangular linkage between an open position and a closed position; and a U-shaped leg spring comprising a folded metal strip so as to define a two layered leg spring having a first leg, a second leg mounted on said third axle, and a bent portion interconnecting said first and said second legs, wherein said first leg acts on said inner link so as to urge said inner link into the closed position when said casing is in or near the closed position, and wherein an end of said second leg, which is remote from said bent portion, encircles said third axle connecting said outer link to said hinge arm.

7. A hinge as claimed in claim 6, further comprising an element formed of plastic material, said element being fixedly positioned on said inner link at a position thereon adjacent the pivotal connection of said inner link to said hinge arm, said element having a curved guiding surface, wherein said leg spring bears on said guiding surface of said element.

8. A hinge as claimed in claim 6, wherein both ends of said first and second legs of said leg spring are directed towards said casing.

9. A hinge as claimed in claim 7, wherein said first leg of said leg spring is provided with a concave portion that bears on said guiding surface of said element.

10. A hinge as claimed in claim 6, wherein said first leg of said leg spring is turned towards said second leg of said leg spring.

* * * * *